United States Patent
Ito et al.

(10) Patent No.: US 10,753,826 B2
(45) Date of Patent: Aug. 25, 2020

(54) COLLISION TEST APPARATUS USING TEST SAMPLE SUPPORT FOR STRUCTURAL MEMBER

(71) Applicant: NIPPON STEEL & SUMITOMO METAL CORPORATION, Tokyo (JP)

(72) Inventors: Yasunori Ito, Chita (JP); Susumu Yuasa, Nagoya (JP)

(73) Assignee: NIPPON STEEL CORPORATION, Tokyo (JP)

( * ) Notice: Subject to any disclaimer, the term of this patent is extended or adjusted under 35 U.S.C. 154(b) by 293 days.

(21) Appl. No.: 15/037,375

(22) PCT Filed: Dec. 3, 2014

(86) PCT No.: PCT/JP2014/006032
§ 371 (c)(1),
(2) Date: May 18, 2016

(87) PCT Pub. No.: WO2015/083376
PCT Pub. Date: Jun. 11, 2015

(65) Prior Publication Data
US 2016/0290894 A1    Oct. 6, 2016

(30) Foreign Application Priority Data
Dec. 5, 2013   (JP) .................................. 2013-252189

(51) Int. Cl.
*G01M 17/007*    (2006.01)
*G01N 3/30*    (2006.01)
*G01M 7/08*    (2006.01)

(52) U.S. Cl.
CPC .......... *G01M 17/0078* (2013.01); *G01M 7/08* (2013.01); *G01N 3/30* (2013.01)

(58) Field of Classification Search
None
See application file for complete search history.

(56) References Cited

U.S. PATENT DOCUMENTS 1,013,649 A * 1/1912 Grey ............................. 52/837
6,178,805 B1 * 1/2001 Kosaraju ........... G01M 17/0078
                                                              73/12.04
2013/0311126 A1* 11/2013 Scott ................. G01M 17/0078
                                                              702/113

FOREIGN PATENT DOCUMENTS

CN   101551293        10/2009
CN   101551293 A    * 10/2009
(Continued)

OTHER PUBLICATIONS

Mechanics of Materials, p. 113-115, Dec. 1981, with English translation.

*Primary Examiner* — Jill E Culler
*Assistant Examiner* — Ruben C Parco, Jr.
(74) *Attorney, Agent, or Firm* — Clark & Brody LP (57) ABSTRACT

A test sample support for use in a collision test using a center pillar assembly of an automobile body as a test sample, includes a linear main body, a first attachment part, and a second attachment part. A cross section of the main body of the test sample support is an open section of cross-shaped. The first attachment part is secured to the center pillar assembly. The second attachment part is secured to a collision test apparatus. This makes it possible to perform a collision test conveniently and at a low cost, thereby accurately evaluating side collision performance of the center pillar assembly.

10 Claims, 6 Drawing Sheets

(56) References Cited

FOREIGN PATENT DOCUMENTS

| | | | |
|---|---|---|---|
| CN | 102803024 | 11/2012 | |
| ES | 2303806 A1 * | 8/2008 | |
| JP | 2003200287 A * | 7/2003 | |
| JP | 4902027 | 3/2012 | |
| JP | 2013-001171 | 1/2013 | |
| KR | 10-1998-0022488 | 7/1998 | |
| WO | 2009/106656 | 9/2009 | |
| WO | WO-2009106656 A1 * | 9/2009 | ........ G01M 17/0078 |
| WO | 2011/016499 | 2/2011 | |
| WO | WO-2012173278 A1 * | 12/2012 | ........... B62D 25/025 |

\* cited by examiner

COLLISION TEST APPARATUS USING TEST SAMPLE SUPPORT FOR STRUCTURAL MEMBER

TECHNICAL FIELD

The present invention relates to a collision test for evaluating a side collision performance of various structural members constituting a body of an automobile. Particularly, the present invention relates to a test sample support which supports a structural member as a test sample, and is used for a collision test of the structural member, and a collision test apparatus and a collision test method of the structural member by using the aforementioned support.

BACKGROUND ART

Figure 1:
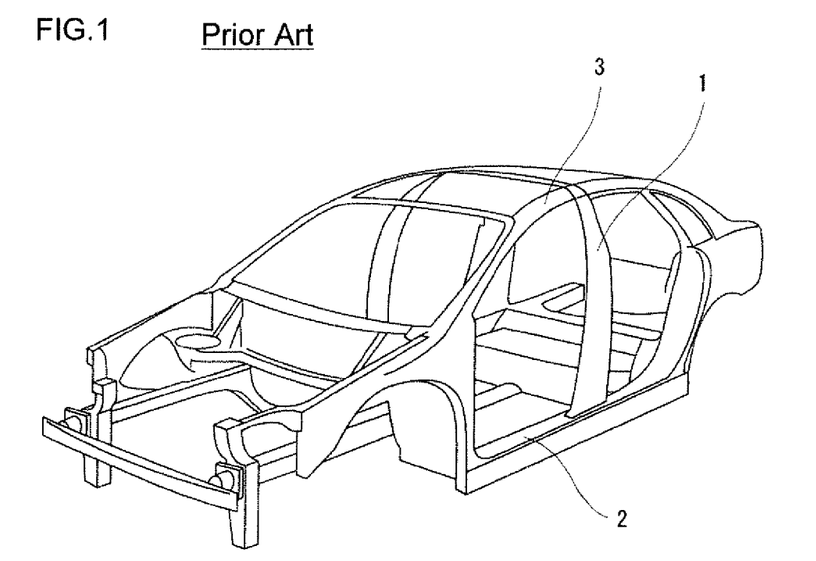
FIG. 1 is a perspective view to show a body of an automobile.

FIG. 1 is a perspective view to show a body of an automobile. The body of an automobile includes various structural members. For example, when an automobile is subjected to a side collision, an injury value of an occupant largely depends on deformation behaviors of a center pillar 1, a side sill 2, and a roof rail 3 among the structural members. The center pillar 1 is disposed in an upright orientation at each of both sides of the body. The side sill 2 is connected to a lower end of the center pillar 1. The roof rail 3 is connected to an upper end of the center pillar 1. The side sill 2 and the roof rail 3 extend in the fore-and-aft direction of the body.

In the development of an automobile, it is essential to evaluate the performance of structural members against side collision. In general, automobile manufacturers fabricate a proto-type vehicle and performs a side collision test by using the proto-type vehicle (hereafter, also referred to as a "real-vehicle test") to evaluate the performance of the structural members. However, such a proto-type vehicle is costly, and the fabrication time of the proto-type vehicle is long. For that reason, chances of performing such evaluation by a real-vehicle test are limited. Moreover, when a problem occurs in the performance of a structural member in a real-vehicle test, it becomes necessary to fabricate another proto-type vehicle of a modified design and perform the real-vehicle test again, causing the automobile development to be delayed. Particularly, since the period of automobile development has been shortened in recent years, it is difficult to perform real-vehicle tests at many conditions. Therefore, it is also not easy to adopt a new material, a new structure, and like for the structural members.

Further, it is difficult for material manufacturers (for example, steel manufacturers), parts manufacturers, and the like other than automobile manufacturers to perform a real-vehicle test independently. This is because there are constraints in the preparation of proto-type vehicles, the construction of real-vehicle test facilities, and the like. For that reason, it is very difficult for a manufacturer of starting material, a manufacturer of parts, or the like to evaluate the collision performance of its own product.

Therefore, it is particularly desirable to perform a collision test by using a single structural member without performing a real-vehicle test which uses a proto-type vehicle, as a technique for evaluating the performance of a structural member against side collision.

For example, Japanese Patent Publication No. 4902027 (Patent Literature 1) discloses a technique of selecting a structural member which has a large contribution to absorption of collision energy, and evaluating the collision performance of this single structural member. It is described that the technique of Patent Literature 1 makes it possible to accurately evaluate performance by performing a collision test using, as a test sample, a center pillar or the like, which undergoes bending deformation during a side collision without fabricating a proto-type vehicle.

Figure 2:
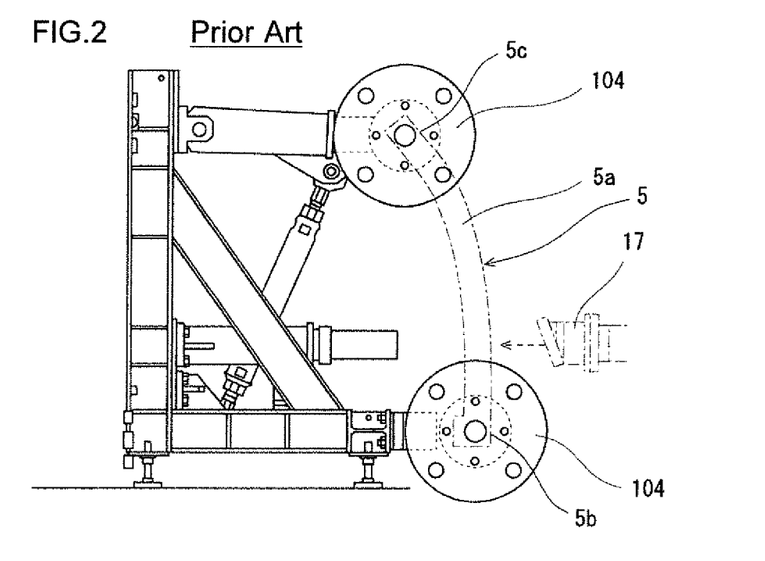
FIG. 2 is a side view to show a collision test apparatus disclosed in Patent Literature 1.

FIG. 2 is a side view to show a collision test apparatus disclosed in Patent Literature 1. As shown in FIG. 2, in a collision test of Patent Literature 1, a center pillar assembly 5 among structural members is used as the test sample. The center pillar assembly 5 includes a pillar part 5a, a lower horizontal part 5b which extends from a lower end of the pillar part 5a in a fore-and-aft direction, and an upper horizontal part 5c which extends from an upper end of the pillar part 5a in the fore-and-aft direction. The center pillar assembly 5 is supported at a total of four portions including the front end and rear end of the lower horizontal part 5b and the front end and rear end of the upper horizontal part 5c via a flywheel 104, respectively. During the collision test, an impact is applied to the pillar part 5a by an impactor 17 which moves in the horizontal direction. The flywheel 104 serves to simulate deformation resistance of the side sill 2 and the roof rail 3 when subjected to an impact load, and reproduces deformation behavior of the center pillar 1 similar to that in a real-vehicle test.

In reality, however, upon a side collision in a real-vehicle test, the side sill 2 and the roof rail 3 undergo torsional deformation and bending deformation at the same time as the pillar part 5a undergoes bending deformation. In other words, the side sill 2 and the roof rail 3 undergo plastic deformation. In this respect, in the technique of Patent Literature 1, the flywheel 104 which simulates the side sill 2 and the roof rail 3 allows rotation and does not undergo plastic deformation. For that reason, there is a risk that results obtained from the collision test of Patent Literature 1 deviate from results of a real-vehicle test.

Moreover, the technique of Patent Literature 1 is laborious in assembling the center pillar assembly 5 to the test apparatus. Further, during a collision test of Patent Literature 1, the deformation behavior of the pillar part 5a is observed by a camera (not shown). In that occasion, the flywheel 104 hinders the photographing by the camera.

CITATION LIST

Patent Literature

Patent Literature 1: Japanese Patent Publication No. 4902027

SUMMARY OF INVENTION

Technical Problem

The present invention has been made in view of the above described problems. An object of the present invention is to provide a test sample support, and a collision test apparatus and a collision test method of the structural member by using the support, which have the following features, relating to a collision test using a structural member of an automobile body as a test sample:

collision test can be performed conveniently and at a low cost; and side collision performance of a structural member can be accurately evaluated.

Solution to Problem

A test sample support according to an embodiment of the present invention is a test sample support for use in a collision test using a structural member of an automobile body as a test sample.

The test sample support includes:

a linear main body, a first attachment part to be connected by welding to one end of both ends of the main body and adapted to be secured to the structural member, and a second attachment part to be connected by welding to another end of the both ends and adapted to be secured to a collision test apparatus, wherein a cross section of the main body is an open section.

In the above described test sample support, the cross section of the main body is preferably cross-shaped. In this case, the main body is preferably made up of two equilateral angle steels which are joined by welding to each other.

In the above described test sample support, the main body can be made up of a plurality of angle steels which are joined by welding or a bolt to one another. In this case, the angle steel is preferably an equilateral angle steel, an inequilateral angle steel, a channel steel, or a T-shaped steel.

In the above described test sample support, the main body can be made up of a single angle steel. In this case, the angle steel is preferably an equilateral angle steel, an inequilateral angle steel, a channel steel, an H-shaped steel, an I-shaped steel, or a T-shaped steel.

In the above described test sample support, a steel sheet may be joined by welding to all or a part of the circumference of the main body.

In the above described test sample support, a gradually varied section may be formed in a part of the main body.

A collision test apparatus according to an embodiment of the present invention is a collision test apparatus using a structural member of an automobile body as a test sample.

The first attachment part of the above described test sample support is secured to each of both ends of the structural member.

The collision test apparatus includes:

a rigid wall to which the second attachment part of each test sample support is secured;

an impactor for applying impact to the structural member from its side;

a camera for observing deformation behavior of the structural member; and a measurement instrument for measuring a load acting on the impactor and a displacement of the impactor.

The above described collision test apparatus preferably includes a connector between the second attachment part of the test sample support and the rigid wall.

In the above described collision test apparatus, the structural member is a center pillar assembly and is preferably disposed in an upright orientation.

A collision test method according to an embodiment of the present invention is a collision test method in which a test sample is a structural member of an automobile body.

The collision test method includes steps of:

securing the first attachment part of the test sample support to each of both ends of the structural member;

securing the second attachment part of each test sample support; and applying impact on the structural member from its side to observe deformation behavior of the structural member, and measuring a load acting on the impactor and a displacement of the impactor.

Advantageous Effects of Invention

A test sample support, and a collision test apparatus and a collision test method of a structural member using the support of the present invention have the following notable effects:

collision test can be performed conveniently and at a low cost; and side collision performance of a structural member can be accurately evaluated.

DESCRIPTION OF EMBODIMENTS

As described above, in the collision test in Patent Literature 1, the test sample support which is used to support a center pillar assembly which is the test sample, is a flywheel which simulates a side sill and a roof rail. This flywheel does not undergo plastic deformation during the collision test. On the other hand, in an actual real-vehicle test, the side sill and the roof rail undergo torsional deformation, and bending deformation at the same time. In conclusion, the situation of the collision test in Patent Literature 1 is different from that of a real-vehicle test. Accordingly, the present inventors have conducted an intensive study on a convenient test sample support which can replace the flywheel used in the collision test in Patent Literature 1.

Properties required of the test sample support are, for example, deformation properties (torsional deformation and bending deformation) of the side sill and the roof rail when the test sample is a center pillar assembly. In conclusion, appropriate torsional rigidity and bending rigidity are demanded of the test sample support. As a test sample support to satisfy such properties, the present inventors first conducted a study on those test sample supports each of whose cross section is a closed section.

Figure 3:
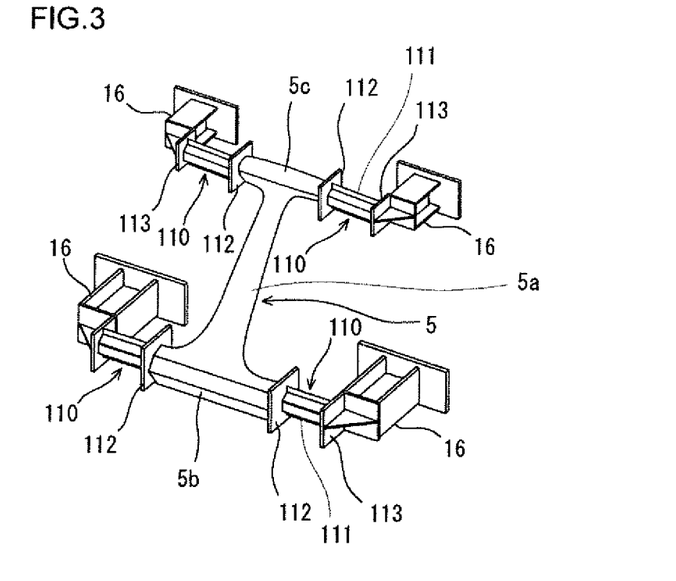
FIG. 3 is a perspective view to show a collision test apparatus using a test sample support whose cross section is a closed section.
Figure 4:
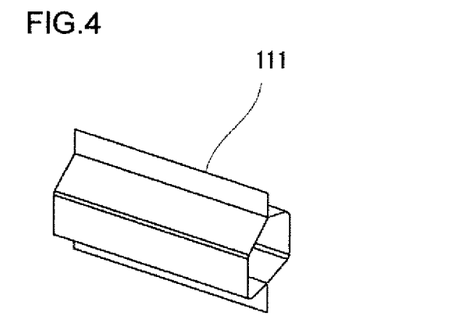
FIG. 4 is a perspective view to show a main body of the test sample support shown in FIG. 3.

FIG. 3 is a perspective view to show a collision test apparatus using a test sample support whose cross section is a closed section. FIG. 4 is a perspective view to show a main body of the test sample support shown in FIG. 3. FIGS. 3 and 4 exemplify a case in which collision test is performed on a center pillar assembly 5 as a test sample.

As shown in FIG. 3, the center pillar assembly 5 includes a pillar part 5a, a lower horizontal part 5b, and an upper horizontal part 5c. The pillar part 5a corresponds to the center pillar 1 shown in FIG. 1. The lower horizontal part 5b extends from a lower end of the pillar part 5a in the fore-and-aft direction thereof, and constitutes a part of the side sill 2 shown in FIG. 1. The upper horizontal part 5c extends from an upper end of the pillar part 5a in the fore-and-aft direction thereof, and constitutes a part of a roof rail 3.

A test sample support 110 includes a linear main body 111, a first attachment part 112, and a second attachment part 113. The main body 111 of the test sample support 110 is formed by combining two press formed products having a hat-shaped cross section and joining them together by welding as shown in FIG. 4. The cross section of the main body 111 is a closed section whose circumference is closed. The first attachment part 112 is connected by welding to one end of both ends of the main body 111. The second attachment part 113 is connected by welding to the other end of both ends of the main body 111.

The test sample support 110 is secured to a supporting point of the center pillar assembly 5. Specifically, the test sample support 110 is disposed at each of total of 4 locations including the front end and rear end of the lower horizontal part 5b, and the front end and rear end of the upper horizontal part 5c of the center pillar assembly 5. The first attachment part 112 of each test sample support 110 is secured by welding to each of the front end and rear end of the lower horizontal part 5b and to each of the front end and rear end of the upper horizontal part 5c.

The center pillar assembly 5 to which the test sample supports 110 have been attached is secured to the collision test apparatus (not shown) with the pillar part 5a being kept in an upright orientation. Specifically, the second attachment part 113 of each test sample support 110 is secured to the rigid wall (not shown) of the collision test apparatus via a connector 16.

In a state that the center pillar assembly 5 is secured to the collision test apparatus, the main body 111 of each test sample support 110 is disposed in an orientation to extend in the fore-and-aft direction. Then, when performing a collision test, an impact is applied to the pillar part 5a from its side by an impactor (not shown) which moves in the horizontal direction.

Figure 5:
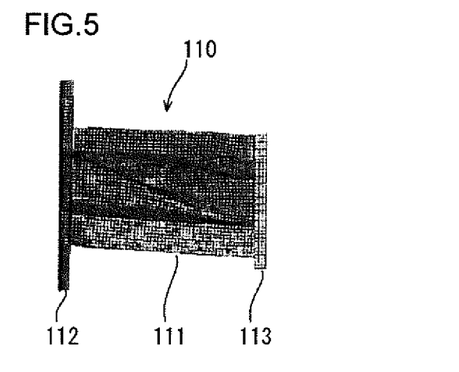
FIG. 5 is a stress analysis diagram to show a deformed state of the test sample support when the collision test apparatus shown in FIG. 3 is adopted.

FIG. 5 is a stress analysis diagram to show a deformed state of the test sample support when the collision test apparatus shown in FIG. 3 is adopted. In a case of the test sample support 110 whose cross section is a closed section, that is, a test sample support 110 which is formed by joining by welding two press formed products each having a hat-shaped cross section as shown in FIG. 4, torsional deformation and bending deformation occur caused by an impact load during collision test as in an actual real-vehicle test, as shown in FIG. 5. However, in this case, as obvious from the stress distribution shown by light and shade in FIG. 5, a top plate part and a vertical wall part of the test sample support 110 undergo plastic deformation in an irregular manner while being buckled. For this reason, variations are likely to occur in the results obtained by the collision test.

Therefore, it cannot be said that a collision test using a test sample support 110 whose cross section is a closed section is sufficient to accurately evaluate the side collision performance of a structural member.

The present inventors have conducted further studies in consideration of the above described matters, to complete the present invention. Hereafter, embodiments will be described in detail regarding the test sample support of the present invention, and the collision test apparatus and collision test method of a structural member by using the aforementioned support.

Figure 6:
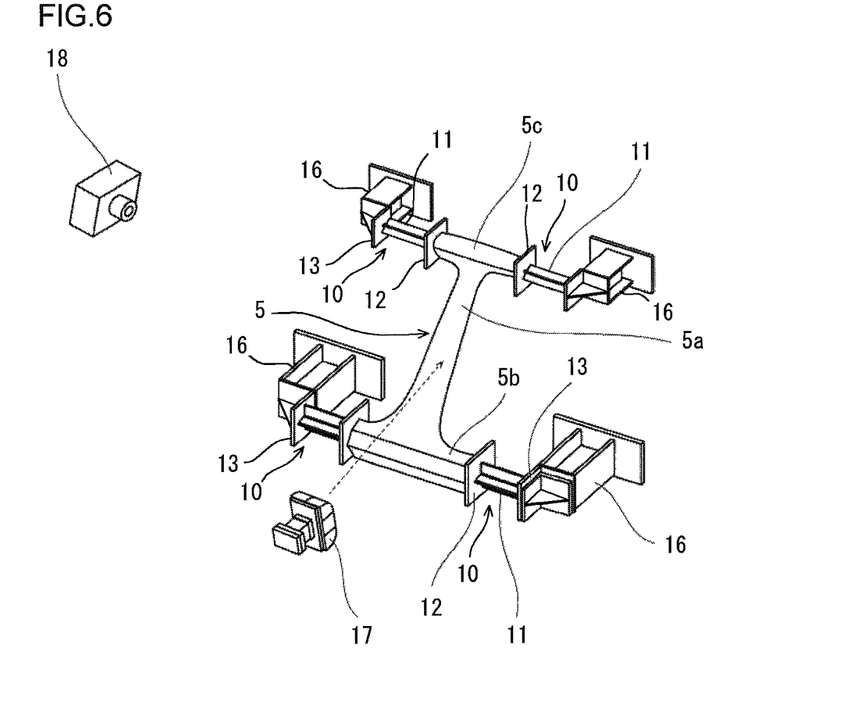
FIG. 6 is a perspective view to show a collision test apparatus using a test sample support of the present embodiment.
Figure 7:
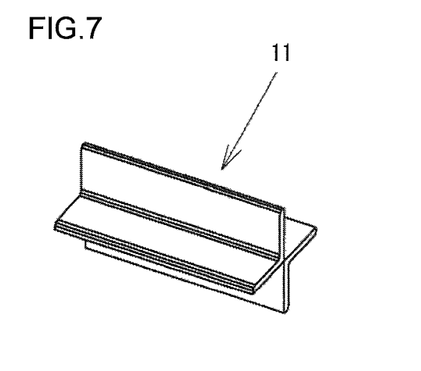
FIG. 7 is a perspective view to show a main body of the test sample support shown in FIG. 6.

FIG. 6 is a perspective view to show a collision test apparatus using a test sample support of the present embodiment. FIG. 7 is a perspective view to show a main body of the test sample support shown in FIG. 6. FIGS. 6 and 7, as well as FIGS. 3 and 4, exemplify a case in which collision test is performed on the center pillar assembly 5 as the test sample, in which overlapping description will be conveniently omitted.

The test sample support 10 includes a linear main body 11, a first attachment part 12, and a second attachment part 13. The cross section of the main body 11 of the test sample support 10 is an open section whose circumference is opened. The cross section of the main body 11 is cross-shaped, and made up of two equilateral angle steels having an L-shape. Specifically, corner portions of the equilateral angle steels are butt welded over the entire region in the longitudinal direction, thereby joining them together.

The first attachment part 12 is connected by welding to one end of both ends of the main body 11. The second attachment part 13 is connected by welding to the other end of both ends of the main body 11. These first attachment part 12 and second attachment part 13 are, for example, flat steels.

The test sample support 10 is secured to a supporting point of the center pillar assembly 5. Specifically, the test sample support 10 is disposed at each of total of 4 locations including the front end and rear end of the lower horizontal part 5b, and the front end and rear end of the upper horizontal part 5c of the center pillar assembly 5. The first attachment part 12 of the test sample support 10 is secured by welding to each of the front end and rear end of the lower horizontal part 5b and to each of the front end and rear end of the upper horizontal part 5c.

The center pillar assembly 5 to which the test sample supports 10 have been attached is secured to the collision test apparatus (not shown) with the pillar part 5a being kept in an upright orientation. Specifically, the second attachment part 13 of each test sample support 10 is secured to a rigid wall (not shown) of the collision test apparatus. FIG. 6 exemplifies a case in which the second attachment part 13 of each test sample support 10 is secured to the rigid wall via the connector 16. The rigid wall is a complete rigid body made of cast steel and secured to the ground. The second attachment part 13 of each test sample support 10 and the connector 16 are connected to each other by welding or a bolt. The connector 16 is formed, for example, by combining a plurality of flat steels, angle steels, or the like and joining them by welding or a bolt, and is a rigid body which is hardly plastically deformed. The connector 16 and the rigid wall are detachably connected by a bolt.

The material of the test sample support 10 will not be particularly limited, provided that it is a metal. The material of the test sample support 10 is preferably a carbon steel.

In a state in which the center pillar assembly 5 is secured to the collision test apparatus, the main body 11 of each test sample support 10 is disposed in an orientation to extend in the fore-and-aft direction. Then, when performing a collision test, an impact is applied to the pillar part 5*a* from its side by an impactor 17 which moves in the horizontal direction. The impactor 17 is attached to a carriage (not shown), and applies an impact load, which corresponds to a side collision in a real-vehicle test, to the pillar part 5*a*. The carriage is equipped with a measuring instrument such as a load cell and a displacement meter. Moreover, during a collision test, deformation behavior of the entire pillar part 5*a* is observed by moving image photographing with a camera 18. Further, in the course of the impactor 17 intruding into the center pillar assembly 5, a load (reactive force) acting on the impactor 17 and an intruding amount of the impactor 17 are measured by the above described measurement instrument. Note that when photographing with the camera 18, the pillar part 5*a* to be photographed is illuminated by an illumination device.

Figure 8:
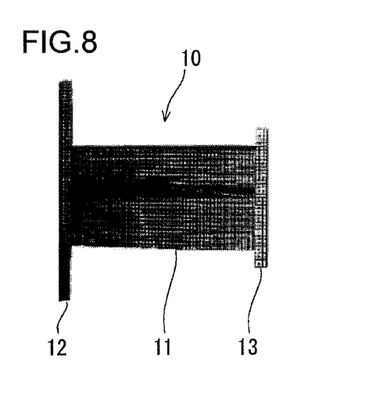
FIG. 8 is a stress analysis diagram to show a deformed state of the test sample support when the collision test apparatus of the present embodiment is adopted.

FIG. 8 is a stress analysis diagram to show a deformed state of the test sample support when the collision test apparatus of the present embodiment is adopted. In a case of the test sample support 10 of the present embodiment, that is, a test sample support 10 whose cross section is an open section as shown in FIG. 7, torsional deformation and bending deformation occur caused by an impact load during collision test as in an actual real-vehicle test, as shown in FIG. 8. Moreover, in this case, as obvious from the stress distribution shown by light and shade in FIG. 8, uniform plastic deformation occurs without occurrence of buckling. For this reason, the results obtained by the collision test will be stable.

In this way, according to a collision test by use of a test sample support of the present embodiment, since the test sample support has an appropriate torsional rigidity and bending rigidity, the deformation behavior of a structural member (for example, a center pillar assembly), which is the test sample, becomes equivalent to that in a real-vehicle test. Therefore, it becomes possible to accurately evaluate the side collision performance of a structural member. Moreover, the test sample support of the present embodiment can be easily fabricated since the cross section of its main body is a simple open section. Therefore, it becomes possible to perform collision test conveniently and at a low cost. Moreover, since the collision test of the present embodiment does not use a flywheel as the test sample support as in Patent Literature 1, it is possible to ensure a sufficient field of view of the camera for photographing the deformation behavior of the test sample.

The test sample support 10 of the present embodiment can take various forms as long as the cross section of the main body 11 is an open section. For example, the cross sectional shape of the main body 11 will not be limited to a cross-shape, but may be a U-shape, an L-shape, a T-shape, or the like. Moreover, the main body 11 may be formed by combining a plurality of angle steels, or by using a single angle steel. When a plurality of angle steels are combined, the joining method thereof may either be welding, or fastening by a bolt. The angle steel to be adopted in this case is, for example, an equilateral angle steel, an inequilateral angle steel, a channel steel, a T-shaped steel, and the like. On the other hand, when a single angle steel is used, the angle steel is, for example, an equilateral angle steel, an inequilateral angle steel, a channel steel, an H-shaped steel, an I-shaped steel, a T-shaped steel, and the like. Any of the angle steels is a general purpose product, which can be easily procured.

FIGS. 9A to 9F are each a cross sectional view to show a variant of the test sample support of the present embodiment. The main body 11 shown in FIG. 9A corresponds to that shown in FIG. 7. In other words, the main body 11 has a cross section of cross-shape, and is formed by joining by welding two equilateral angle steels to each other.

Figure 9A:
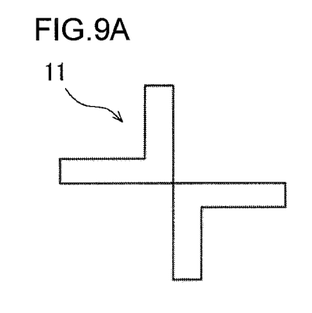
FIG. 9A is a cross sectional view to show a variant of the test sample support of the present embodiment.
Figure 9B:
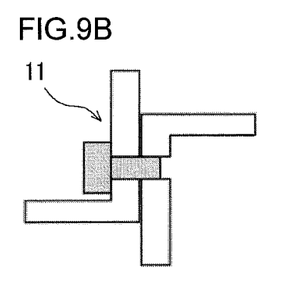
FIG. 9B is a cross sectional view to show a variant of the test sample support of the present embodiment.
Figure 9C:
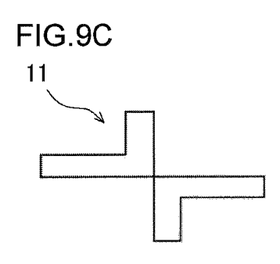
FIG. 9C is a cross sectional view to show a variant of the test sample support of the present embodiment.
Figure 9D:
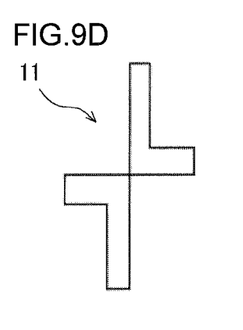
FIG. 9D is a cross sectional view to show a variant of the test sample support of the present embodiment.

The main bodies 11 shown in FIGS. 9B to 9D each have a cross section of cross shape, and is made up of two inequilateral angle steels. Among these, the main body 11 shown in FIG. 9B is formed by joining angle steels to each other by a bolt. The main bodies 11 shown in FIGS. 9C and 9D are each formed by joining by welding angle steels to each other. In these cases, torsional rigidity is not variable, and only bending rigidity can be adjustable.

Figure 9E:
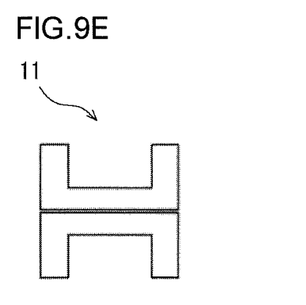
FIG. 9E is a cross sectional view to show a variant of the test sample support of the present embodiment.
Figure 9F:
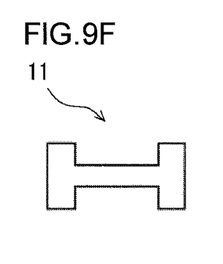
FIG. 9F is a cross sectional view to show a variant of the test sample support of the present embodiment.

The main body 11 shown in FIG. 9E has a cross section of H-shape, and is formed by joining by welding two channel steels to each other. The main body 11 shown in FIG. 9F has a cross section of I-shape, and is one made up of a single I-shaped steel.

Figure 10:
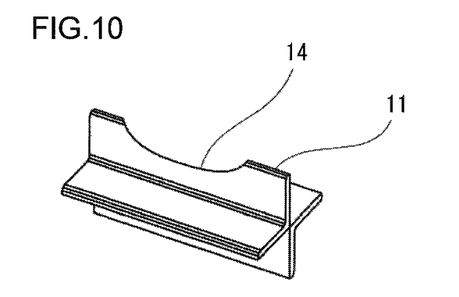
FIG. 10 is a perspective view to show a variant of the test sample support of the present embodiment.
Figure 11:
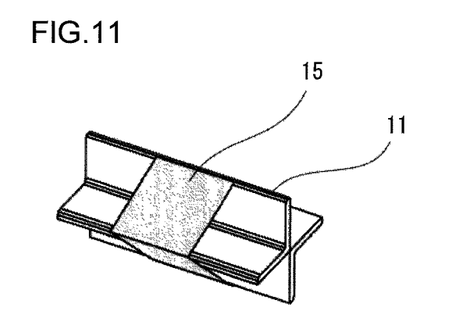
FIG. 11 is a perspective view to show a variant of the test sample support of the present embodiment.

Moreover, the test sample support 10 of the present invention can easily adjust its rigidity. For example, as shown in FIG. 10, forming a gradually varied section 14 in a part of the angle steel constituting the main body 11 of the test sample support 10 can appropriately reduce the rigidity of the test sample support 10. The gradually varied section 14 means a shape (for example, a concave part) which is not uniform, but is gradually varied. Moreover, as shown in FIG. 11, attaching by welding a steel sheet 15 to the circumference of the angle steel that constitutes the main body 11 of the test sample support 10 can appropriately enhance the rigidity of the test sample support 10. The attaching region of the steel sheet 15 may be all or a part of the circumference of the main body 11. In addition to these, adjusting the dimensions of the main body 11, particularly its longitudinal dimension can adjust the rigidity of the test sample support 10.

The adjustment amounts of dimension and shape, and rigidity of the test sample support are set, for example, in the following way. A CAE (Computer Aided Engineering) analysis is performed in advance on a structural member to be the test sample, and structural members around that structural member. The deformation properties of structural members around the test sample are acquired by the CAE analysis. For example, when the test sample is a center pillar assembly, the properties of torsional deformation and bending deformation of the side sill and the roof rail are acquired. Then, based on the deformation properties, the adjustment amounts of dimension and shape, and rigidity of the test sample support 10 are set.

The above described embodiment shows an example in which a center pillar assembly is selected as the structural member to be the test sample. However, the structural member to be the test sample is not limited to the center pillar assembly. The test sample may be a side sill, a roof rail, or the like.

EXAMPLES

In order to confirm effects of the present invention, the following tests were performed. As an inventive example of the present invention, a center pillar assembly was supported by using the test sample support having an open section as shown in FIGS. 6 and 7, and a side collision test was conducted. As a reference example of the present invention, a center pillar assembly was supported by using the test sample support having a closed section as shown in FIGS. 3 and 4, and a side collision test was conducted. Moreover, for a comparison purpose, a real-vehicle test was conducted. All of the tests were conducted conforming to the specifications of SUV SIDE IMPACT of IIHS (Insurance Institute for Highway Safety). A reactive force acting on the impactor, and an intruding amount of the impactor were investigated during the course of the impactor intruding into the center pillar assembly during a test.

Figure 12:
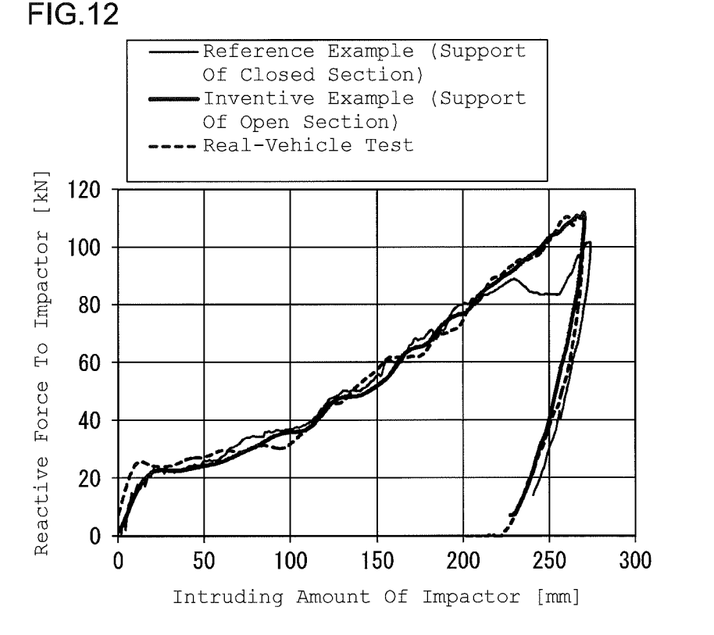
FIG. 12 is a diagram to show a relationship between intruding amount of an impactor and reactive force to the impactor as a test result of an example.

FIG. 12 is a diagram to show a relationship between intruding amount of an impactor and reactive force to the impactor as a test result of an example. As shown in FIG. 12, in the test of the inventive example of the present invention which used the test sample support having an open section, a result similar to that in the real-vehicle test was obtained. In contrast to this, in the test of the reference example which used the test sample support having a closed section, it is revealed that the reactive force to the impactor decreased in a final stage of the intrusion of the impactor, thus deviating from the result of the real-vehicle test. This is caused by the fact that buckling occurred in the test sample support.

INDUSTRIAL APPLICABILITY

The present invention can be effectively used for evaluating the collision performance of structural members constituting an automobile body.

REFERENCE SIGNS LIST

1: Center pillar
2: Side sill
3: Roof rail
5: Center pillar assembly
5a: Pillar part
5b: Lower horizontal part
5c: Upper horizontal part
10: Test sample support
11: Main body
12: First attachment part
13: Second attachment part
14: Gradually varied section
15: Steel sheet
16: Connector
17: Impactor
18: Camera

The invention claimed is:

1. A collision test apparatus using a structural member of an automobile body as a test sample, wherein
the structural member is a center pillar assembly, and the center pillar assembly is set upright in the collision test apparatus; and
the center pillar assembly includes a pillar part, a lower horizontal part extending forward and backward from a lower end of the pillar part, and an upper horizontal part extending forward and backward from an upper end of the pillar part;
the collision test apparatus comprises:
a first test sample support, the first test sample support comprising:
a first linear main body to extend forward from a front end of the lower horizontal part in a direction same as the extending direction of the lower horizontal part;
a first lower front attachment part connected by welding to a rear end of the first linear main body and adapted to be secured to the front end of the lower horizontal part; and
a second lower front attachment part connected by welding to a front end of the first linear main body, wherein
a cross section of the first linear main body is an open section,
a second test sample support, the second test sample support comprising:
a second linear main body to extend backward from a rear end of the lower horizontal part in a direction same as the extending direction of the lower horizontal part;
a first lower rear attachment part connected by welding to a front end of the second linear main body and adapted to be secured to the rear end of the lower horizontal part; and
a second lower rear attachment part connected by welding to a rear end of the second linear main body, wherein
a cross section of the second linear main body is an open section, wherein the rear end of the first linear main body faces the front end of the second linear main body;
a third test sample support, the third test sample support comprising:
a third linear main body to extend forward from a front end of the upper horizontal part in a direction same as the extending direction of the upper horizontal part;
a first upper front attachment part connected by welding to a rear end of the third linear main body and adapted to be secured to the front end of the upper horizontal part; and
a second upper front attachment part connected by welding to a front end of the third linear main body, wherein
a cross section of the third linear main body is an open section, a fourth test sample support, the fourth test sample support comprising:
a fourth linear main body to extend backward from a rear end of the upper horizontal part in a direction same as the extending direction of the upper horizontal part;
a first upper rear attachment part connected by welding to a front end of the fourth linear main body and adapted to be secured to the rear end of the upper horizontal part; and
a second upper rear attachment part connected by welding to a rear end of the fourth linear main body, wherein
a cross section of the fourth linear main body is an open section,
wherein the rear end of the third linear main body faces the front end of the fourth linear main body;
a wall to which the second lower front attachment part, the second lower rear attachment part, the second upper front attachment part and the second upper rear attachment part are secured;
an impactor for applying impact to the pillar part from its side; a camera for observing deformation behavior of the pillar part; and
a measurement instrument for measuring a load acting on the impactor and a displacement of the impactor;
wherein by having the rear end of the first linear main body face the front end of the second linear main body, the first and second linear main bodies are aligned with the lower horizontal part; and by having the rear end of the third linear main body face the front end of the fourth linear main body, the third and fourth linear main bodies are aligned with the upper horizontal part; and wherein due to alignment of the first and second linear main bodies with the lower horizontal part, alignment of the third and fourth linear main bodies with the upper horizontal part, and having the open cross section for each of the first, second, third, and fourth linear main bodies, the first, second, third and fourth test sample supports have uniform plastic deformation without buckling when torsional deformation and bending deformation occurs during a side collision test for the center pillar assembly.

2. The collision test apparatus according to claim 1, wherein the collision test apparatus comprises connectors between the second lower front attachment part and the wall, between the second lower rear attachment part and the wall, between the second upper front attachment part and the wall, and between the second upper rear attachment part and the wall.

3. The collision test apparatus according to claim 1, wherein the cross section of each of the first linear main body, the second linear main body, the third linear main body and the fourth linear main body is cross-shaped.

4. The collision test apparatus according to claim 1, wherein each of the first linear main body, the second linear main body, the third linear main body and the fourth linear main body is made up of two equilateral angle steels which are joined by welding to each other.

5. The collision test apparatus according to claim 1, wherein each of the first linear main body, the second linear main body, the third linear main body and the fourth linear main body is made up of a plurality of angle steels which are joined by welding or a bolt to one another.

6. The collision test apparatus according to claim 5, wherein each of the angle steels is an equilateral angle steel, an inequilateral angle steel, a channel steel, or a T-shaped steel.

7. The collision test apparatus according to claim 1, wherein each of the first linear main body, the second linear main body, the third linear main body and the fourth linear main body is made up of a single angle steel.

8. The collision test apparatus according to claim 7, wherein the angle steel is an equilateral angle steel, an inequilateral angle steel, a channel steel, an H-shaped steel, an I-shaped steel, or a T-shaped steel.

9. The collision test apparatus according to claim 1, wherein a respective steel sheet is joined by welding to all or a part of a circumference of each of the first linear main body, the second linear main body, the third linear main body and the fourth linear main body.

10. The collision test apparatus according to claim 1, wherein a gradually varied section is formed in a part of each of the first linear main body, the second linear main body, the third linear main body and the fourth linear main body.

* * * * *